Nov. 13, 1956  R. A. NELSON  2,770,767
WINDING ARRANGEMENT USING A TERTIARY WINDING
Filed Dec. 14, 1954
Fig. 1.
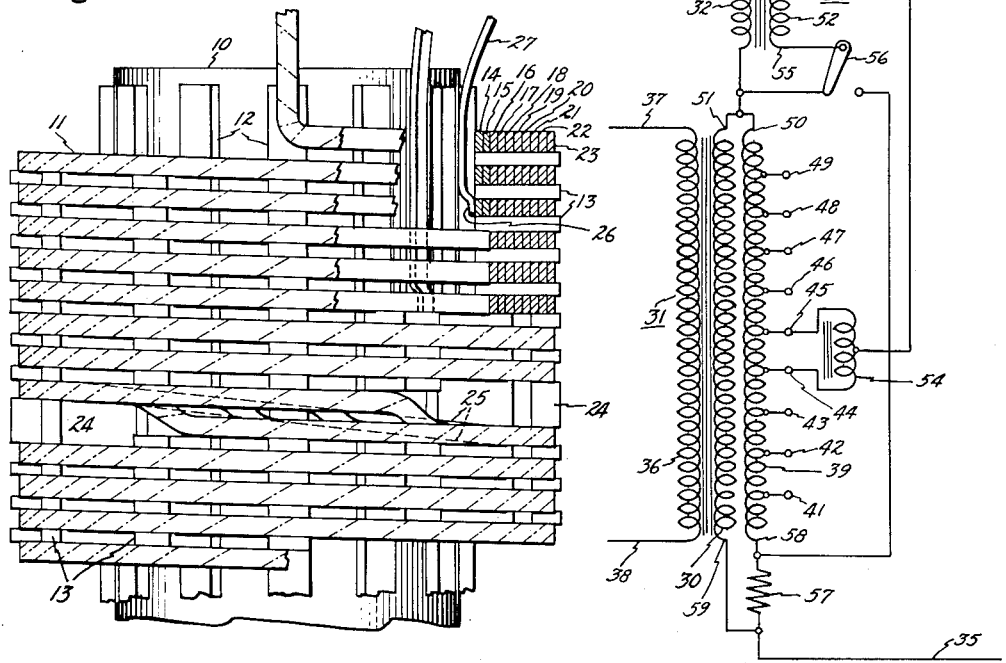
Fig. 2.
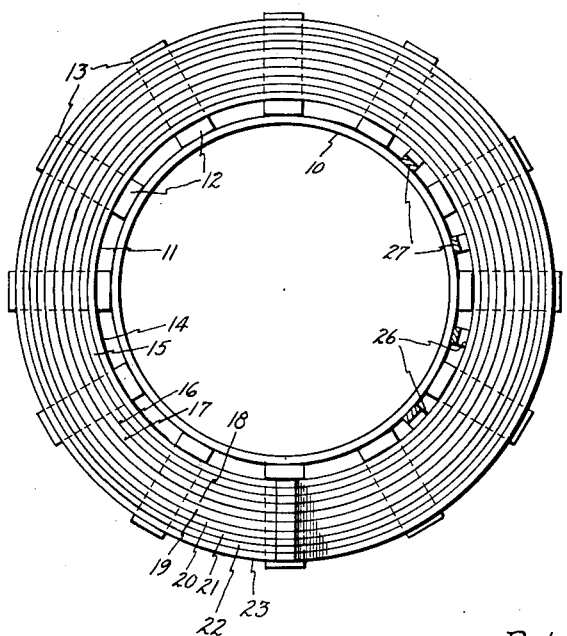
Fig. 3.
Inventor
Robert A. Nelson,
by Gilbert P. Tarleton
His Attorney.

United States Patent Office 2,770,767
Patented Nov. 13, 1956

2,770,767

WINDING ARRANGEMENT USING A TERTIARY WINDING

Robert A. Nelson, Rome, Ga., assignor to General Electric Company, a corporation of New York Application December 14, 1954, Serial No. 475,119

8 Claims. (Cl. 323—43.5)

This invention relates to transformer windings, and more in particular to an improved arrangement for the windings of "load tap changing" transformers.

In the past systems employing a load tap changing transformer in combination with a series transformer for the regulation of voltage have generally been connected such that the high current winding of the series transformer is in series with the high current winding of the load tap changing transformer, and a voltage output from the load tap changing transformer is fed to the other winding of the series transformer to control the voltage across the high current winding of the series transformer. Such systems are especially useful where the transformers are to carry large currents, since by this means the output voltage may be varied without switching the entire coil currents. When the currents controlled by the system are large, the load tap changing transformer high current winding usually consists of a relatively few numbers of helically wound turns. The windings themselves generally employ a plurality of stacked electrically parallel insulated strands or conductors in order to reduce eddy current losses. When a plurality of parallel conductors is used, however, it is usually desirable to transpose the strands of the winding in order to reduce the circulating currents arising from the various strands having different flux linkages. When no taps are present in a winding, the strands are usually transposed in three steps throughout the length of the winding, thereby providing only one complete transposition. For improved transposition, however, more steps may be used if desired. When taps are included in such a winding however, it is advisable to provide a complete set of transpositions between each set of taps to avoid the circulating currents, or in other words, each strand should occupy each transposed position for a substantially equal distance between each electrically adjacent pair of taps of the winding. In transformers about twice the winding space is required for a turn having a single transposition as for a turn without such transposition. If it is required that a complete set of transpositions be made for each tap of a transformer, it is obvious that, with even a few taps, the winding length of the transformer is greatly increased, and the cost of materials for the transformer is also increased. If the number of taps is large as compared with the number of turns of the winding, the winding length may be considerably more than it would be without the taps. Thus, it is impractical to attempt to completely transpose the strands of a helical winding between each set of taps.

This difficulty has been eliminated in the present invention by employing a tapped tertiary winding on the transformer, and thereby not tapping the high current winding. The tertiary winding does not carry the heavy currents that are carried by the main high current winding, and therefore requires only one or a few strands. Thus the tertiary winding does not require transpositions, and the only transpositions required are those that are usually found in the now untapped high current winding.

It is, therefore, an object of this invention to provide an improved load tap changing transformer.

Another object is to provide a tapped tertiary winding in a helically wound load tap changing transformer to reduce the number of winding transpositions necessary in such transformers.

A further object of this invention is to reduce the winding space and eliminate the necessity for complete transpositions between each electrically adjacent pair of taps of a load tap changing transformer having helical windings by providing a tapped tertiary winding on such transformers.

My invention will be better understood from the following description taken in connection with the accompanying drawing, and its scope will be pointed out in the appended claims.

Fig. 1 of the drawing shows the helical windings of a load tap changing transformer having a tapped tertiary winding according to the principles of this invention.

Fig. 2 is a plan view of the windings of Fig. 1.

Fig. 3 is a circuit diagram illustrating typical connections for using the load tap changing transformer of this invention in a voltage regulating system.

Referring to Figures 1 and 2, a typical helically wound load tap changing transformer embodying the principles of this invention has a winding cylinder 10 adapted to be mounted on a transformer core (not shown). The windings 11 are spaced from the cylinder by means of a plurality of axially extending key spacers 12 positioned between the cylinder 10 and the windings. The turns are supported in substantially horizontal planes by spacers 13 which extend radially from the winding cylinder 10. The windings 11 as herein illustrated consist of a pair of inner conductors 14 and 15, and eight outer conductors 16—23. These conductors are each separately insulated. The eight outer conductors 16—23 comprise the main secondary winding of the transformer, and are connected in parallel by external connections (not shown). In order to eliminate circulating current in the winding due to varying flux linkages for the various strands, the conductors 16—23 are transposed at several places along the length of the winding. In usual practice, these transpositions are placed at three equidistant places in the windings, although for clarity only one transposition is herein illustrated. As shown, a wider spacer 24 is required for the transposition. The two inner conductors 14 and 15 comprise a tertiary coil, and are not transposed, passing through the transposition spacer 24 in the manner shown by dashed lines 25. The tertiary winding is provided with a plurality of taps 26 connected to the tap leads 27 extending longitudinally through the space between the cylinder 10 and the windings 11. When more than one conductor is employed in the tertiary winding as shown, the taps are connected to all of the strands at the tap point. If desired, the tertiary winding strands may be transposed to occupy different positions when several strands are used, but this is not necessary. The tertiary winding may be located on the outside of the secondary winding, but it should be adjacent to the secondary winding.

Although not shown in the drawing, a primary winding of generally similar construction to the secondary coil is mounted outside of the secondary coil.

Referring now to the circuit of Fig. 3, in a typical circuit employing the transformer of this invention, the main secondary winding 30 of a load tap changing transformer 31 is connected in series with the secondary winding 32 of a series transformer 33 to supply an output voltage between the leads 34 and 35. The primary winding 36 of load tap changing transformer 31 is connected to a source of voltage (not shown) between leads 37 and 38. The tertiary winding 39 of load tap changing transformer 31 is provided with a plurality of taps 41—49, and one end 50 of the tertiary winding is connected to one end 51 of the main secondary winding 30. Excitation voltage for the primary winding 52 of the series transformer 33 is provided by connections to the tertiary winding taps. Thus, one end 53 of primary winding 52 is connected to the taps of tertiary winding 39 by way of a reactor 54, and the other end 55 of the primary winding 52 is connected by way of a switch 56 to either end of the load ratio control transformer tertiary winding 39. The switch 56 enables reversing of the phase of the excitation voltage for the primary winding 52 of the series transformer 33 so that the voltage between output leads 34 and 35 will be either the sum or the difference of the voltage of the two secondary coils 30 and 32 as desired. The tap connection to reactor 54 is the usual connection to provide for output voltages intermediate the taps without having appreciable circulating currents and without impeding the flow of output current during changing of the tap connections.

In Fig. 3 a resistance 57 is shown connecting the lower end 58 of the tertiary winding 39 to the lower end 59 of main secondary winding 30. This resistance is provided to prevent large voltages from appearing between the ends 58 and 59 of the windings and arcing across the insulation, since in the winding system of this invention these ends are physically adjacent. The resistance is of such a value to prevent appreciable circulating current from flowing through the windings, and it is preferably made of negative resistance-current characteristic material. If desired, this resistance may be omitted and no connection made between the ends 58 and 59 of the windings.

Thus, according to this invention, by providing a load tap changing transformer with a tapped tertiary winding, it is not necessary to have additional transpositions in the secondary winding due to tap connections thereon. By this means the winding space of such transformers is greatly reduced, and as a result the transformers are more economical to build and require less space. Since the tertiary winding does not carry large currents, it is not required to have as large conductor cross-section, and transpositions of this winding are generally unnecessary.

The preceding discussion has referred to the winding adjacent to the tertiary winding and having one end connected thereto as a secondary winding. Since in some applications the regulation may be accomplished in the input of the system, the previously described "secondary" winding may actually be a primary winding. Thus it is to be understood in the previous discussion that the term "secondary winding" shall not be limited to the actual use of that winding of the load tap changing transformer, but shall mean merely a high current transposed strand winding.

It will be understood, of course, that, while the form of the invention herein shown and described constitutes the preferred embodiment of the invention, it is not intended herein to illustrate all of the possible equivalent forms or modifications of the invention. It will be understood that the words used are words of description rather than of limitation, and that various changes may be substituted without departing from the spirit or scope of the invention herein described.

What I claim as new and desire to secure by Letters Patent of the United States is:

1. A winding for a transformer comprising a helically wound high current winding having a plurality of parallel connected stacked insulated conducting strands, said strands being transposed to reduce circulating currents, a helically wound tapped tertiary winding wound adjacent to said high current winding and conducting means connecting one end of said high current winding to the adjacent end of said tertiary winding.

2. A winding for a transformer comprising a helically wound high current winding having a plurality of electrically parallel insulated strands to reduce eddy current losses in said high current winding, a set of strand transpositions in said high current winding to reduce circulating current in said high current winding, a helically wound tapped tertiary winding adjacent to said high current winding and having less conductor cross-section than said high current winding, and conducting means connecting one end of said high current winding to the adjacent end of said tertiary winding.

3. A winding for a transformer comprising a helically wound high current winding having a plurality of parallel connected stacked insulated conducting strands to reduce eddy current losses in said high current winding, said strands being transposed to reduce circulating current in said high current winding, a helically wound untransposed tapped tertiary winding adjacent to said high current winding and having less conductor cross section than said high current winding, conducting means connecting one end of said high current winding to the adjacent end of said tertiary winding, and another winding in inductive relationship to said high current and tertiary windings.

4. The winding of claim 3 wherein the other end of said high current winding is connected to the other end of said tertiary winding through resistance means to prevent large voltages from appearing across said other ends and to prevent the flow of substantial circulating currents through said high current and tertiary winding.

5. A winding for a transformer comprising a winding cylinder adapted to be mounted over a magnetic core, axially extending spacers positioned on the outside surface of cylinder, a tapped helical tertiary winding wound on said spacers and having tap leads extending longitudinally along said cylinder between said cylinder and said tertiary winding, a helical high current winding wound over said tertiary winding and being comprised of a plurality of electrically parallel strands, a set of transpositions in said high current winding, the conductor cross section of said tertiary winding being less than that of said high current winding, and conductor means connecting one end of said high current winding to the adjacent end of said tertiary winding.

6. The winding of claim 5 wherein said tertiary winding is comprised of a plurality of electrically parallel strands and said strands are untransposed.

7. A winding for a transformer comprising a winding cylinder adapted to be mounted over a magnetic core, axially extending spacers positioned on the outside of said cylinder, a helical winding wound on said spacers, said helical winding being comprised of a plurality of electrically insulated conductor strands, the radially innermost conductor strands comprising a tertiary winding and the radially outermost conductor strands comprising a high current winding, said tertiary winding having a plurality of taps with the tap leads extending longitudinally along said cylinder between said cylinder and said tertiary winding, the conductor strands of said high current winding being parallel connected and also being transposed to reduce circulating current, the conductor cross section of said tertiary winding being less than that of said high current winding, and conductor means connecting one end of said high current winding to the adjacent end of said tertiary winding.

8. The winding of claim 7 wherein the other ends of said high current and tertiary windings are connected together by resistance means to prevent large voltages from appearing across said other ends and to prevent the flow of substantial circulating current through said windings.

References Cited in the file of this patent

UNITED STATES PATENTS

| 633,855 | Lamme | Sept. 26, 1899 |
| 2,089,860 | Rypinski | Aug. 10, 1937 |

FOREIGN PATENTS

| 15,647 | Great Britain | of 1912 |
| 538,851 | Germany | Nov. 19, 1931 |